Dec. 10, 1946. G. MEILI 2,412,412
CONTROL MECHANISM FOR HOISTING EQUIPMENT
Filed Oct. 23, 1944 4 Sheets-Sheet 1

GOTTFRIED MEILI,
INVENTOR.

BY
ATTORNEY.

Patented Dec. 10, 1946

2,412,412

UNITED STATES PATENT OFFICE 2,412,412

CONTROL MECHANISM FOR HOISTING EQUIPMENT

Gottfried Meili, San Gabriel, Calif., assignor of one-half to Marion P. McCaffrey, Los Angeles, Calif., and one-half to William Ruddock, South Pasadena, Calif.

Application October 23, 1944, Serial No. 559,920

15 Claims. (Cl. 214—140)

This invention relates to control mechanism for hoisting equipment or the like.

Many types of hoisting equipment, material handling equipment and the like, are provided with a winding drum for manipulating the line which raises and lowers or otherwise controls the load. Such a drum is often operated by means of apparatus including a friction clutch adapted to connect the drum to a source of power for rotation in a direction to wind and tension the line, as well as a brake for holding the drum against rotation when the clutch is disengaged, and to control rotation of the drum in the opposite direction to unwind the line in response to tension therein caused by the load. It is an object of this invention to provide improved control mechanism for such apparatus.

In the use of such equipment particularly for hoisting a load, it is important that the operation of the clutch and brake be closely correlated. Thus, if the load is suspended by the line, the clutch being disengaged and the brake applied to prevent rotation of the drum, and it is desired to raise the load additionally, the clutch must be at least partly engaged before the brake is entirely released, to prevent dropping the load. While such a drop might be only for a short distance, nevertheless it would be a source of danger and productive of severe stresses in the apparatus, since the clutch and power plant must check such downward movement of the load before the load can be raised. On the other hand, it is necessary for the brake to be entirely released before the clutch is engaged, as even brief operation of the drum by the power plant with the brake engaged imposes an unnecessary load on the power plant, as well as causing unnecessary and undesirable heating and wear of the brake. It is thus another object of this invention to provide interlocking mechanism for simultaneously operating a clutch and a brake.

When it is desired to lower the load, the brake and clutch both must be disengaged. Thus, it is another object of this invention to provide such control mechanism, which may be operated optionally to disengage the clutch and release the brake.

It is still another object of this invention to provide a clutch and brake control mechanism wherein the brake is normally engaged and the clutch is normally disengaged, which is operable optionally either to release the brake and engage the clutch, or to release the brake while maintaining the clutch disengaged.

In connection with a normally engaged brake, it is common to provide means exerting a resilient force continuously urging the brake to engaged condition. It is another object of this invention to provide a clutch and brake control mechanism so arranged that such resilient force cooperates with the mechanism to provide a fulcrum point for the means operating the clutch to engage and disengage.

In an application of William Ruddock, an assignee of the present application, filed November 10, 1941, bearing Serial Number 418,557, now Patent No. 2,362,406, granted November 7, 1944, and entitled "Material handling apparatus," an apparatus is disclosed wherein a material engaging element or bucket is mounted on one end of a horizontally disposed arm which is swingable in a vertical plane to raise and lower the bucket. The arm is pivotally supported on the frame of a tractor or the like and extends longitudinally of and above the tractor, for substantially the entire length of the tractor. The bucket is at the forward end of the arm, and the bucket and arm are controlled by cables passing about suitable sheaves and downwardly to a pair of winding drums on opposite sides of the tractor adjacent the rear end thereof. These drums are mounted on an extension of the tractor frame, and are arranged to be driven from the tractor power plant through suitable drive mechanism including a clutch. Brake means are also provided for these drums. Substantially the entire weight of the bucket and any load therein acts on this frame extension through said cables and drums, the frame extension thereby maintaining such weight suspended, and it is thus liable to distortion and flexure, causing misalignment of the drive mechanism. It is thus another object of this invention to provide a driving mechanism permitting misalignment of its parts, and capable of operation under such conditions, without damage.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Figures 1, 2:
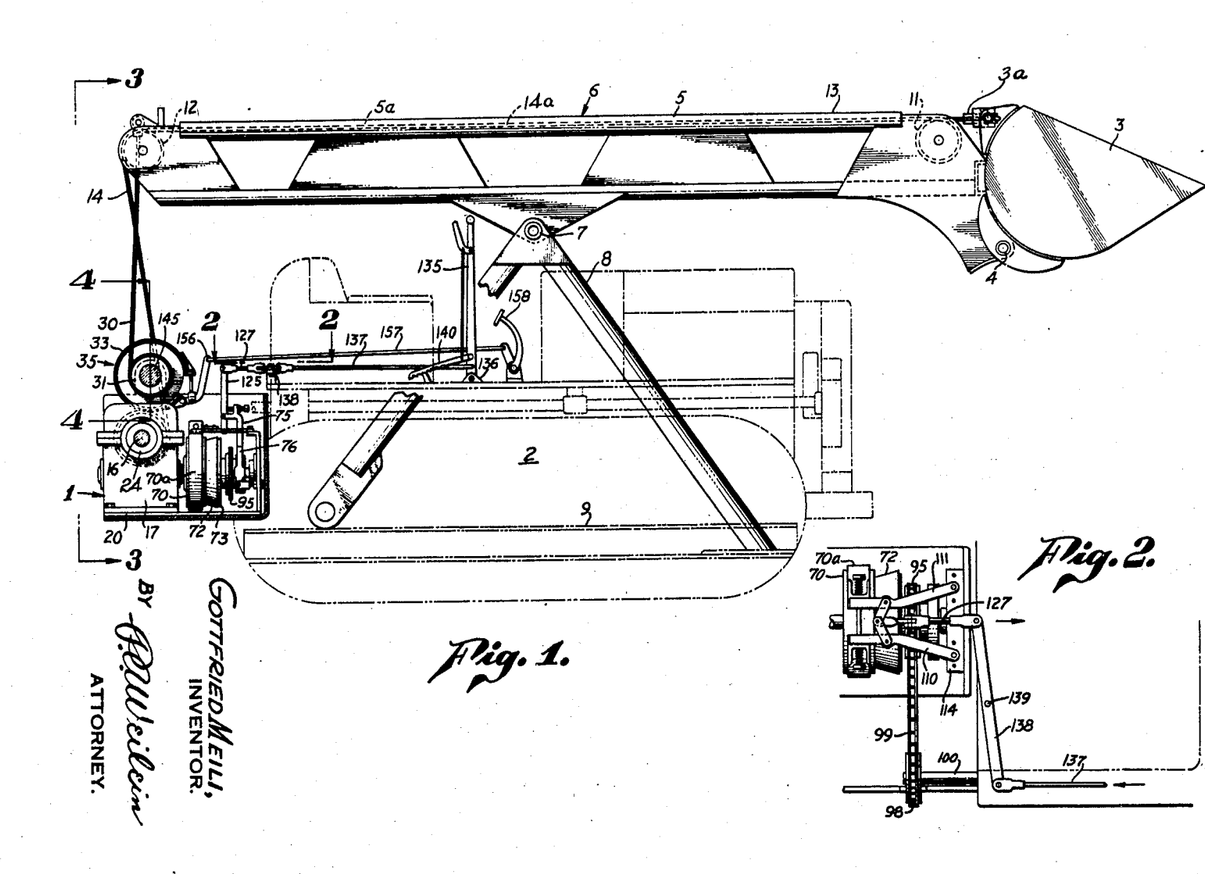
Figure 1 is an elevation of material handling apparatus incorporating the invention, certain parts being broken away to better illustrate the control mechanism.
Figure 2 is a fragmentary plan view of the structure of Figure 1, taken as indicated by line 2—2 of Figure 1.

Referring to Figure 1 of the drawings, the control mechanism generally indicated by 1 is shown as incorporated in a tractor shovel of the type disclosed in said prior filed application. Therein, the material engaging element or bucket 3 is pivotally mounted at 4 on the forward end of an arm or boom structure 5, the bucket 3 and the arm structure 5 forming a bucket and arm assembly 6. The arm structure 5 is pivotally supported at a point 7 intermediate its ends for movement to raise and lower the bucket, by a frame structure 8 suitably mounted on the frame 9 of the tractor 2.

Figure 3:
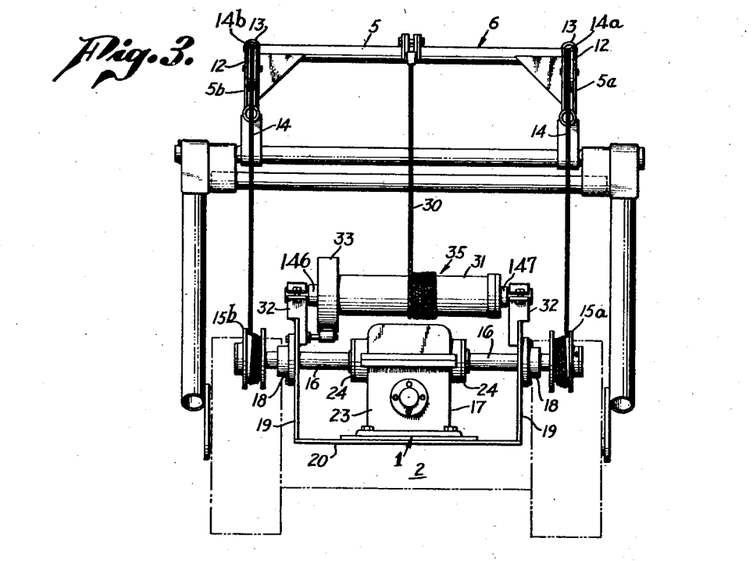
Figure 3 is a rear view of the structure of Figure 1, taken as indicated by line 3—3 thereon.

As shown in Figures 1 and 3, the arm structure 5 comprises a pair of suitably joined side arms 5—a and 5—b, each provided with sheave wheels 11 and 12, rotatably mounted on its forward and rear ends respectively, and a tubular top member 13. A cable 14 is suitably attached to the top of the bucket 3 near its opposite sides as by sheaves, one of which is shown at 3a, and has a pair of reaches 14a and 14b extending rearwardly from the bucket, over the sheaves 11, through the tubular top members 13, and over the rear sheaves 12 to winding drums 15a and 15b. These winding drums 15a and 15b are fixed on the opposite ends of the winding shaft 16 which extends across the rear end of the tractor 2 and through a speed reducer or transmission 17. The cable 14 extends continuously from one winding drum, as 15a, to the bucket 3, between the sheaves on the bucket, and to the other winding drum 15b. In this way, stresses in the cable reaches 14a and 14b are equalized.

The winding shaft 16 is rotatably supported in bearings 18 adjacent the drums 15a and 15b, bearings 18 being mounted on side plates 19 of the supporting frame 20 of the control mechanism 1. This frame 20 is attached to the frame of the tractor 2 adjacent the rear end thereof in any suitable manner, and forms an extension of the tractor frame. Speed reducer 17 may be of any preferred type, several of which are readily obtainable in the open market, and in general comprises an oil tight casing 23 providing additional bearings 24 for the shaft 16. The shaft 16 has a gear 26 fixed thereon (Figure 6), meshing with a cooperating gear 27 on the driving shaft or rotatable element 28, positioned below the shaft 16 and extending longitudinally of the tractor 2 and through the casing 23.

The shaft 28 is arranged to be driven or restrained against rotation by the control mechanism to be presently described, thereby serving to control the movement of the arm structure 5 to raise and lower the bucket 3, as well as to control the movement of the bucket 3 between load dumping and load retaining positions. For this purpose it is essential that the gearing 26 and 27, which may be of the worm or spiral type, should not be self locking.

The mode of operating such a tractor shovel is briefly as follows: With the bucket 3 in the load retaining position illustrated, the boom 5 is swung about its pivot 7 by slackening the cable 14 to lower the bucket 3 to the desired loading position, and the tractor is advanced to crowd the bucket into the material to cause it to pick up a load. With the bucket 3 loaded, the drums 15a and 15b are rotated to cause the cable 14 to be wound thereon, which causes the bucket 3 to be maintained in load retaining position, and swings the arm 5 upwardly to raise the bucket 3 to a desired height, where it is retained by securing the drums 15a and 15b against rotation. The tractor 2 is then maneuvered to bring the bucket 3 to the place where it is desired to deposit the load.

Since it is necessary that the cable 14 be slacked to permit the bucket 3 to swing downwardly about its pivot 4 to dump its load, means independent of the cable 14 must be provided for maintaining the boom 5 elevated. For this purpose an additional cable 30 is attached to the rear of the arm structure 5. The cable 30 is wound on a drum 31, which is rotatably supported above the winding shaft 16, by brackets 32 mounted on the sides 19 of the supporting frame 20. Brake mechanism 33 is provided to control the rotation of the drum 31. With the brake 33 operated to prevent rotation of the drum 31, the cable 30 will act to prevent lowering movement of the arm structure 5 while the bucket 3 is allowed to swing downwardly about its pivot 4. To provide for automatically winding the line 30 on the drum 31 as the arm structure 5 is moved to raise the bucket 3, the drum 31 is arranged to be continuously urged in cable winding direction by a spring. Thus, the drum 31 and associated parts may be conveniently termed a spring driven winch and designated in their entirety by numeral 35. This winch 35 will be hereinafter more fully described.

The mechanism for controlling the rotation of the rotatable element or shaft 28, and thereby manipulating the bucket 3, will now be described, attention being directed for this purpose to Figures 6 to 12. As clearly shown in Figure 6, the shaft 28 projects a short distance out of the housing 23 and is provided with a keyway 28—a.

Means 40, forming an extension of the shaft 28, are mounted on the projecting end thereof, the said means being of novel form, whereby its attachment in driving relation to the shaft is simplified, and its space requirements are substantially reduced. Further, from an inspection of Figure 1, it will be apparent that substantially the entire weight of the bucket 3 and any load therein, will be transmitted to the frame 20 by the cable 14, the winding drums 15—a and 15—b, and their supports, tending to move the frame 20 upwardly. Such upward movement is opposed by the weight of the tractor 2 acting on the frame 20. Under these conditions, there may be a slight tendency for the frame 20 to be distorted or flexed in a direction generally vertical and parallel to the axis of the shaft 28. The mounting of the extension forming means 40 on the shaft 28 is so arranged that any such distortion of the frame 20 is readily accommodated without injury to the driving and control mechanism for the shaft 28 or interference with its proper operation.

Thus, a tubular mandrel 41, having a flange 42 adjacent the speed reducer 17, is supported at its flanged end on a flanged bushing 43, as by having its end portion telescoped over the hub of the bushing and engaging a portion 43—b thereon having an enlarged diameter. A loose running fit is provided between the enlarged portion 43—b of the bushing and the bore of the mandrel, a clearance of the order of .002" being provided between their engaging surfaces. The mandrel 41 is in driving relation with the bushing 43, as by a plurality of drive pins 44 secured, as by welding, in the flange 45 of the bushing 43, and passing through clearance holes 42—a in the flange 42 of the mandrel.

The bushing 43 is mounted on the end portion of the shaft 28, having a press-fit therewith, and is prevented from rotating thereon by a key 46 engaging a keyway 47 in the bushing and the keyway 28—a in the shaft. The outer end portion of the shaft 28 has a reduced portion 28—b forming a shoulder 28—c which cooperates with a shoulder 46—a formed in the bore of the bushing, to limit axial movement of the bushing 43 to the left on the shaft 28. The bushing is restrained against axial movement to the right due to its press fit on the shaft 28. The mandrel 41 supported on the bushing 43 is also axially fixed, as will be presently described.

Figure 6:
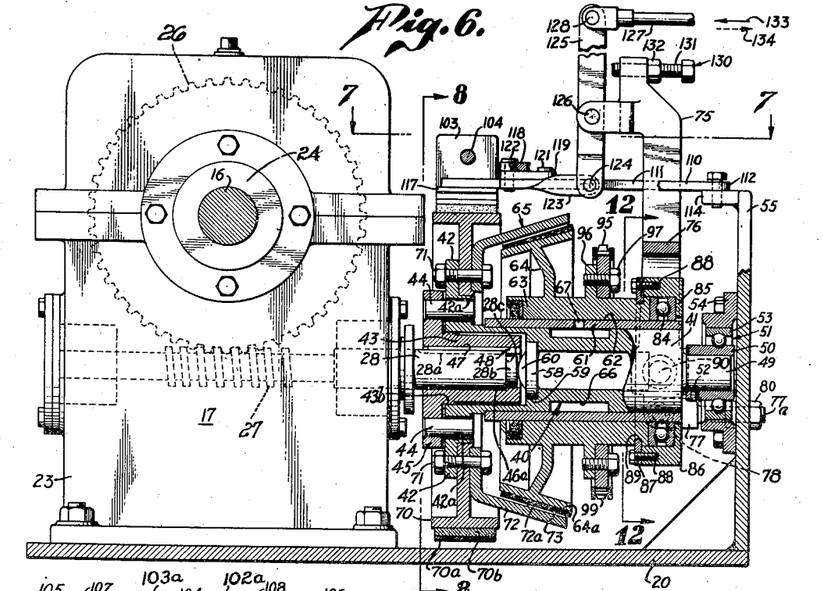
Figure 6 is a detail view, partly in section, of the control mechanism.

As clearly shown in Figure 6, the parts are so proportioned, that with the shoulders 28—c and 46—a in contact, there is substantial clearance between the flanges 42 and 45. The described arrangement permits substantial angular misalignment between the shaft 28 and the mandrel 41, such as might be caused by upward flexing of the frame 20, without any cramping or damage, and without any interference with the transfer of rotational force between the shaft and the mandrel.

The opposite or right hand end of the mandrel 41 has a portion 49 of reduced diameter, on which is secured the inner race 50 of an anti-friction radial and thrust bearing 51, as by a set screw 52. The outer race 53 of the bearing 51 is supported in a bearing cage 54 attached to a vertical transverse wall 55 of the supporting frame 20. A thrust button 58, seated on a shoulder 59 within the bore of the mandrel 41, has a convex face or thrust surface 60, which contacts the end surface of the shaft 28. A sleeve 61, pressed on the exterior of the mandrel 41, provides a bearing surface 62 for the hub 63 of the driving member or spider 64 of a friction clutch 65, and cooperates with an annular groove 66 in the mandrel 41 to form a lubricant chamber. Lubricant may be placed in this chamber through a conventional pressure fitting and passageway (not shown), and escapes to lubricate the surface 62, through one or more passageways 67 extending through the sleeve 61.

A brake drum 70 is secured to the flange 42 of the mandrel 41 by a plurality of bolts 71, which also serve to attach the driven member 72 of the clutch 65 to the flange 42. The member 72 has a coned inner surface 72—a, the outer face 64—a of the clutch spider 64 being correspondingly coned and provided with a suitable friction facing 73. In the relative positions shown in Figure 6, clearance is present between the facing 73 and the surface 72—a, hence the clutch members 64 and 72 are not in driving relation. Movement of the spider 64 axially to the left, causes the friction surfaces to engage each other, placing the clutch members in driving relation, in a well understood manner.

Figures 9, 10, 11, 12:
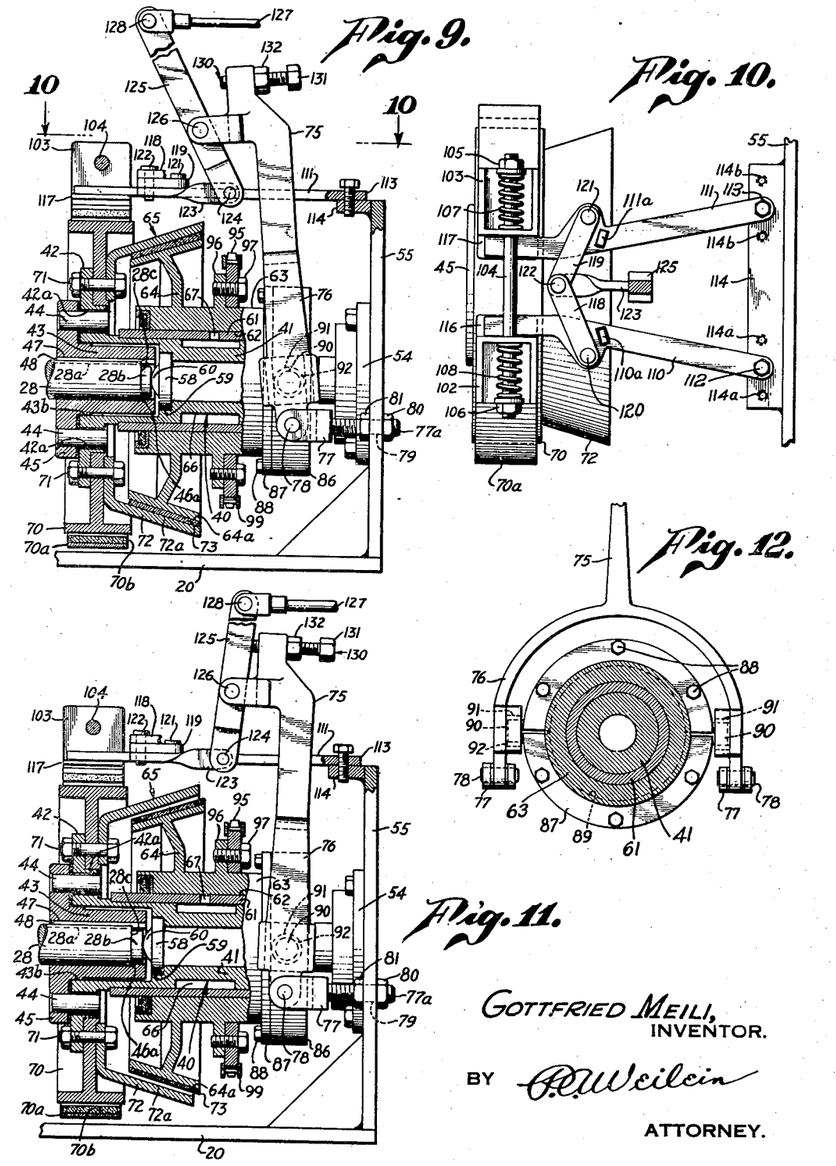
Figure 9 is a view similar to Figure 6, but showing a different operating position of the mechanism.
Figure 10 is a cross section similar to Figure 7, taken substantially on line 10—10 of Figure 9.
Figure 11 is a view similar to Figures 6 and 9, but showing still another operating position of the mechanism.
Figure 12 is a cross section, taken on line 12—12 of Figure 6.

Axial movement is imparted to the clutch spider 64 and the hub 63 thereof, by a clutch operating lever or arm 75, having a forked lower end 76 spanning the hub 63 (see Figure 12). The clutch arm 75 is swingably supported by a pair of clevises 77, which are pivotally connected by pins 78 to the lower ends of the legs of the fork 76. Each clevis has a threaded shank 77—a passing through a clearance hole 79 in the wall 55, nuts 80 and 81 threaded on the shank 77—a, by engaging opposite sides of the wall 55, serving to secure the clevis in adjusted position.

A thrust bearing 84 is confined between the right hand end of the hub 63 and the flange 85 of a bearing cage 86. The cage 86 is axially secured to the hub 63 by a split ring 87, engaging a groove 89 in the surface of the hub and secured to the cage 86 by a plurality of cap screws 88. In this way, the cage 86 is freely rotatable with respect to the hub 63. The cage 86 carries a pair of projecting pintles 90, which slidingly engage grooves or slots 91 formed respectively in the legs of the fork 76. A bushing 92, freely rotatable on each pintle 90, is interposed between each pintle and the sides of the cooperating slot 91. (See Figure 9).

The clutch spider 64 is driven by means of a sprocket 95, attached to an integral flange 96 on the hub 63, by a plurality of cap screws 97. As best shown in Figures 1 and 2, the sprocket 95 is connected to a driving sprocket 98 by a chain 99. The sprocket 98 is fixed on a shaft 100, which extends to the forward end of the tractor, where it is suitably connected to the tractor motor. In this way, whenever the tractor motor is in operation, the clutch spider 64 is rotating, and by appropriate operation of the clutch operating arm 75, the drums 15—a and 15—b can be caused to rotate, to raise the bucket 3 and the arm 5.

Figures 7, 8:
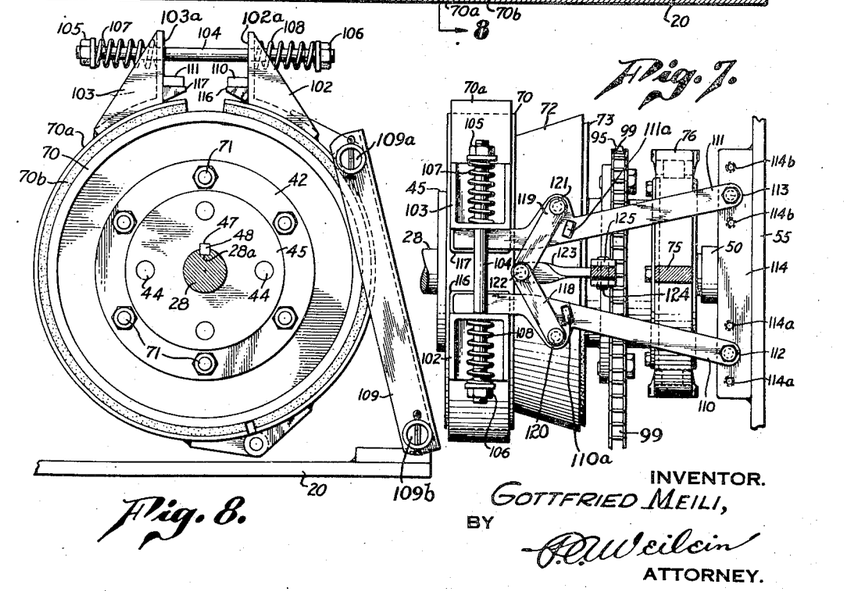
Figure 7 is a fragmentary horizontal cross section, taken on line 7—7 of Figure 6.
Figure 8 is a vertical cross section, taken on line 8—8 of Figure 6.

The brake drum 70 is embraced by a cooperating brake band 70—a, carrying suitable brake lining 70—b, and which is normally urged into engagement with the drum to prevent rotation thereof (see Figures 6, 7 and 8). Thus, projecting ears 102 and 103 are secured on the band 70—a near its ends. A rod 104 extends slidably through an opening in each ear, and has abutments 105 or 106 at its opposite ends, which abutments may conveniently be in the form of nuts threaded on the rod 104. Compression springs 107 and 108 are respectively confined between the ear 103 and abutment 105 and between the ear 102 and abutment 106, urging these ears together, and causing the band 70—a to engage the drum. The band 70—a is maintained against rotating with the drum 70 in any convenient manner, as by an anchor link 109, pivotally connected to the band 70—a, as at 109—a, and to the frame 20, as at 109—b.

For releasing the brake, a pair of arms 110 and 111 are each pivotally connected at one end, as 112 and 113, to a bracket 114 secured to the wall 55. The opposite ends of these arms engage respectively the facing surfaces 102—a and 103—a of the ears 102 and 103, being supported on the ears by lugs 116 and 117. The links 118 and 119 are pivoted respectively at one end, as 120 and 121, to the arms 110 and 111, and are pivotally connected at their opposite ends by a pin 122 to form a toggle. An operating or brake release member 123 (see Figure 7) is also connected to the links 118 and 119 by the pin 122, and by movement to the right, and parallel with the axis of the mandrel 41, urges the toggle links 118 and 119 to a position in which they are more nearly in alignment, causing the arms 110 and 111 to urge ears 102 and 103 apart against the force of the springs 107 and 108. The band 70—a is thus released from the drum 70. Suitable stops, such as lugs 110—a and 111—a on the arms 110 and 111, are provided to appropriately restrict movement of the links 118 and 119 into a position in which they would be aligned, and possibly prevent return of the band 70—a into engagement with the drum 70.

Since as previously pointed out, it is desirable to interlock the operation of the clutch 65 and the brake mechanism just described, an operating lever 125 for the brake release member 123 is provided, which is pivotally joined to the member 123 at 124, and is pivotally mounted at 126 near the upper end of the clutch operating arm 75. The lever 125 is arranged to be manipulated by a rod 127, pivoted to the upper end thereof at 128. Additionally, adjustable stop means 130 are provided on the arm 75, for limiting movement of the lever 125 with respect thereto. This stop means may comprise a cap screw 131, threaded through a suitable aperture in the upper end of the arm 75, and secured in adjusted position by a nut 132.

Assuming that all parts are in the relative positions shown in Figures 6, 7 and 8, which may be considered the normal condition, with the shaft 28 held against rotation by the brake band 70—a and clutch 65 disengaged; then upon movement of the rod 127 to the left, as indicated by the solid arrow 133 (Figure 6), the lever 125 will pivot about its connection 124 to the member 123, and swing the arm 75, to cause the clutch spider 64 to engage the clutch member 72, the parts now being in the relative positions illustrated in Figure 9. This is because the force exerted by the springs 107 and 108 opposes separation of the arms 110 and 111 and the straightening of the toggle links 118 and 119. The force of the springs 107 and 108 thus cooperates to restrain movement of the pin 124 so that it forms a fulcrum for the lever 125. Upon engagement of the clutch members 64 and 72, the clutch arm 75 is restrained against further movement to the left, and the pin 126 becomes the fulcrum about which the lever 125 swings in response to continued movement to the left. Such movement of the lever 125 then becomes effective to urge the toggle links 118 and 119 to a position in which they are more nearly in alignment. This urges the levers 110 and 111 apart against the force of the springs 107 and 108, and releases the brake band 70—a.

In this way, by appropriate adjustment of the parts, it can be assured that the clutch 65 is always at least partly engaged before the brake is released, and the possibility of accidentally dropping the bucket or load is guarded against. It can also be assured that the brake is fully released when the clutch is engaged. Furthermore, the operation of the apparatus is simplified, since but one movement of a single control means such as a hand lever 135 (Figure 1) is necessary to operate both the brake and the clutch. The relation between the engagement of the clutch and the release of the brake may be altered by adjusting the spacing of the pivots 112 and 113 which mount the arms 110 and 111, and by altering the tension of the springs 107 and 108. For this purpose a plurality of holes 114—a and 114—b are provided for optionally receiving the pins 112 and 113.

The provision of the stop 130 makes it possible also to release the brake while maintaining the clutch disengaged. Thus, if the rod 127 is urged to the right, from the position of Figure 6, as indicated by the dotted arrow 134, the lever 125 will swing about the pivot 126 until it encounters the stop 130, after which the lever 125 and the arm 75 will swing as a unit about the pins 78, moving the clutch spider 64 further away from the driven clutch member 72, and moving the brake release member 123 to the right to release the brake as before. The relative positions of the parts will now be as illustrated in Figure 11. Thus, when it is desired to lower the load, it is again only necessary to move a single control means, the hand lever 135, but in the opposite direction to that which causes the load to be hoisted.

As shown in Figures 1 and 2, the hand lever 135 is located so as to be conveniently reached by the operator. Thus, it is pivotally supported at the operator's right by a bracket 136 on the frame of the tractor 2, and is connected to the rod 127 by a rod 137 and a lever 138 pivoted to the frame at an intermediate point 139. A suitable latch arrangement 140 may be provided, to retain the lever 135 against undesired movement.

Figure 4:
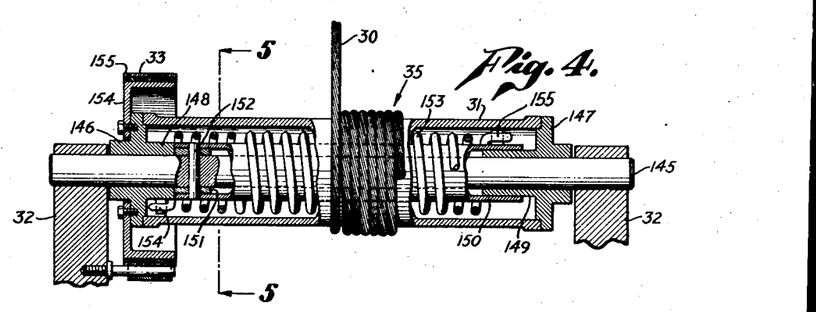
Figure 4 is a detail section taken on line 4—4 of Figure 1.
Figure 5:
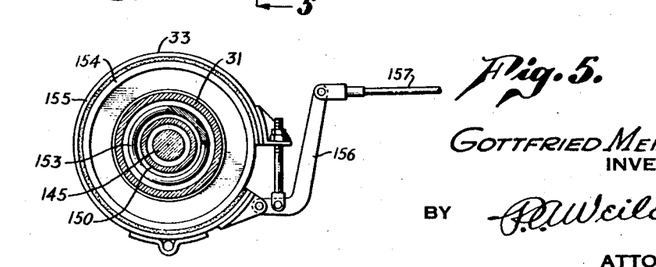
Figure 5 is a cross section taken on line 5—5 of Figure 4.

The spring driven winch 35 will now be described, reference for this purpose being had to Figures 4 and 5. Thus, a shaft 145 is supported and secured against rotation in the previously mentioned brackets 32. The drum 31 upon which the cable 30 is wound, is provided with heads 146 and 147 at its opposite ends having bosses 148 and 149, which rotatably support the drum on the shaft 145. A sleeve 150, having an internal diameter larger than the diameter of the shaft 145, is secured at one end to the shaft 145 by a pin 152 passing through the sleeve and a spacer 151 positioned between the sleeve and the shaft. The other end of the sleeve 150 telescopes over the inner end of the hub 149, the hub being rotatable in the annular space between the shaft and the sleeve.

A spiral spring 153 is supported on the sleeve 150, and is appropriately anchored at one end 154 to the hub 148, and at the other end 155 to the sleeve 150. Thus, rotation of the drum 31 in one direction is opposed by the spring 153, which urges the drum to rotate in the opposite direction. The arrangement is such that as the cable 30 is unwound from the drum 31 in response to tension in the cable, the spring 153 is energized. Upon sufficient reduction of the tension in the cable 30, the spring 153 rotates the drum 31 to rewind the cable thereon and maintain it free of slack.

The brake 33 for controlling or preventing rotation of the drum 31 is a conventional band brake. Thus, a brake drum 154 is suitably secured to one end of the drum 31 and is embraced by a band 155, which is operated to engage the drum by a bell crank 156 and a brake rod 157. Brake rod 157 is connected to a pedal 158 (see Figure 1) for manipulation by the operator.

The operation of the mechanism may now be reviewed. With the tractor motor operating, and the control lever 135 in the neutral position of Figure 1, the brake band 70—a is engaged and the clutch 65 is disengaged, as described in connection with Figure 6. The bucket 3 and the arm 5 are thus held against movement. The control lever 135 is then moved toward the left (Figure 1), or toward the operator, which releases the brake band 70—a and allows the bucket 3 and the arm 5 to lower in response to gravity to a desired point. After this the lever 135 is returned to the mid-position or neutral, resetting the brake. The brake 33 is normally disengaged, so that the drum 31 is rotated by the cable 30 unwinding therefrom, such rotation serving to energize the spring 153. The tractor is then advanced to cause the bucket 3 to pick up a load. When the bucket is loaded, the lever 135 is moved toward the right (Figure 1) which simultaneously releases the brake band 70—a and engages the clutch 65, raising the arm 5 and the bucket 3. Due to the interlocking arrangement of the clutch and brake control previously described, no particular skill is required of the operator to avoid dropping the load either in initially raising the load, or in subsequently raising it an additional distance.

As the load is raised, the cable 30 is automatically wound upon the drum 31 of the spring driven winch, the brake 33 being disengaged to permit the drum 31 to be driven by the spring 153. When it is desired to dump the load, the control lever 135 is moved to neutral and the brake 33 is applied by means of the pedal 158, to prevent the drum 31 rotating, which serves to hold the arm 5 against downward movement, the bucket 3 being held against dumping by the normally engaged brake band 70—a. Upon movement of the lever 135 to the left, the brake band 70—a is disengaged, allowing the bucket 3 to swing down about the pivot 4 and dump. The arm 5, together with the bucket may now be lowered by release of the brake 33, brake 70—a being maintained disengaged for this purpose.

I claim:

1. In material handling equipment, a bucket and arm assembly movable to raise and lower the bucket, said bucket being movable on said arm between load retaining and load dumping positions, a rotatable drum, means connecting said drum with the bucket, whereby rotation of the drum in one direction serves to move the bucket to load retaining position and thereafter to move the arm to raise the bucket, means to optionally cause rotation of the drum in said one direction, means independent of said drum for optionally restraining said arm against movement to lower the bucket, means for controlling rotation of the drum optionally to maintain the bucket in load retaining position or to permit the bucket to dump while said arm is restrained, and common actuating means for said rotation causing means and said control means.

2. In material handling equipment, a bucket and arm assembly movable to raise and lower the bucket, said bucket being movable on said arm between load retaining and load dumping positions, a rotatable drum, means connecting said drum with the bucket whereby rotation of the drum in one direction serves to move the bucket to load retaining position and thereafter to move the arm to raise the bucket, means controlling operation of the bucket and arm assembly comprising a brake normally acting to prevent rotation of the drum, a clutch for connecting the drum for rotation by a source of power, a control member, means whereby movement of said member in one direction causes release of the brake while maintaining the clutch disengaged and in another direction causes engagement of the clutch and release of the brake, and means acting independently of said drum for optionally maintaining said arm against movement to lower the bucket.

3. In material handling equipment, a bucket and arm assembly movable to raise and lower the bucket, said bucket being movable on said arm between load retaining and load dumping positions, a rotatable drum, means connecting said drum with the bucket whereby rotation of the drum in one direction serves to move the bucket to load retaining position and thereafter to move the arm to raise the bucket, means to optionally cause rotation of said drum in said one direction comprising a clutch for connecting said drum with a source of power, a spring driven, brake controlled winch for optionally maintaining said arm against movement to lower the bucket, a normally engaged brake for preventing rotation of the drum, means for optionally releasing the brake, means for actuating the clutch to engage and disengage, and means interlocking said clutch actuating means and the brake release means for substantially simultaneous operation.

4. In material handling equipment, a bucket and arm assembly movable to raise and lower the bucket, said bucket being movable on said arm between load retaining and load dumping positions, a rotatable drum, means connecting said drum with the bucket whereby rotation of the drum in one direction serves to move the bucket to load retaining position and thereafter to move the arm to raise the bucket, means to optionally cause rotation of said drum in said one direction comprising a clutch for connecting said drum with a source of power, means independent of said drum for maintaining said arm against movement to lower the bucket, a normally engaged brake preventing rotation of the drum, means for optionally releasing the brake, means for actuating the clutch to engage and disengage, a common operating member for said clutch and brake, and means forming an interlock between the brake releasing means and the clutch actuating means whereby movement of the operating member in one direction releases the brake and engages the clutch and in another direction disengages the clutch and releases the brake.

5. In control mechanism for a rotatable element, a friction clutch having a pair of relatively axially movable members adapted to be moved into engagement for connecting said element with a source of power, an arm movable axially of said element for moving said clutch members ot engage and disengage, a brake for controlling rotation of said element, a brake actuating member also movable axially of said element, means for moving said arm to cause the clutch to engage or disengage, comprising a member pivoted on the arm, said member also being joined to the brake actuating member, and means forming a stop for limiting relative movement between said arm and said member in one direction.

6. In control mechanism for a rotatable element, a friction clutch for connecting said element with a source of power, a brake for controlling rotation of said element, a pivoted arm for actuating the clutch, a brake actuating member, an operating member pivoted on the arm and pivoted at one end to the brake actuating member, means for restricting movement of said operating member with respect to the arm in one direction to cause said member and said arm to move as a unit about the pivot of the arm and move the brake actuating member in brake releasing direction, and to release the clutch.

7. In control mechanism for a rotatable element, a friction clutch for connecting said element with a source of power, a normally engaged brake for preventing rotation of said element, a pivoted arm movable in one direction to cause the clutch to engage and movable in the opposite direction to disengage the clutch, brake actuating mechanism including a member movable to release the brake, an operating member pivoted on said arm and connected to said brake release member, and stop means for limiting movement between said member and said arm in one direction whereby upon movement of said member in said one direction, said member and said arm move as a unit to release the brake, movement of said member in the opposite direction causing said member to fulcrum about its connection to the brake release mechanism to swing said arm to engage the clutch, said member after engagement of the clutch, pivoting about its connection on said arm to release the brake.

8. In control mechanism for a rotatable element, a friction clutch for connecting said element with a source of power, a normally engaged brake preventing rotation of said element, a pivoted arm for urging said clutch to engage, brake actuating mechanism including a brake release member movable to release the brake, an operating member pivoted at spaced points to said arm and to said brake release member, and means for moving said operating member to cause said arm to engage the clutch, said member fulcruming about its pivot on said arm in response to continued movement to move the brake release member to release the brake.

9. In control mechanism for a rotatable element, a friction clutch for connecting said element with a source of power, a normally engaged brake preventing rotation of said element, a pivoted arm for urging said clutch to engage, brake actuating mechanism including a brake release member movable to release the brake, an operating member pivoted at spaced points to said arm and to said brake release member, and means for moving said operating member to cause said arm to engage the clutch, said member fulcruming about its pivot on said arm in response to continued movement to move the brake release member to release the brake, and means forming a stop to limit movement of said operating member with respect to said arm in the opposite direction, whereby a predetermined movement of said member in said opposite direction causes said member and said arm to move as a unit and release the brake.

10. In control mechanism for a rotatable element, a friction clutch including a member movable axially to cause the clutch to connect said element with a source of power, a brake for controlling rotation of said element, means urging application of said brake to prevent rotation of said element, a brake release member movable substantially parallel with said axially movable clutch member for releasing the brake, and operating means including a pivoted lever, connecting said clutch member and said brake release member for simultaneous operation, movable optionally to release the brake and engage the clutch, or to release the brake and disengage the clutch in accordance with the direction of movement of said means.

11. In control mechanism for a rotatable element, a friction clutch including a member movable axially to cause the clutch to connect said element with a source of power, a brake for controlling rotation of said element, means exerting a resilient force urging said brake to prevent rotation of said element, a brake release member movable to release the brake against said force, and an operating lever pivoted on said brake release member, movement of said lever about said pivot causing axial movement of the clutch member, said force exerting means restraining movement of the brake release member to cause the pivotal connection to form a fulcrum for said lever.

12. In control mechanism for a rotatable element, said element having a projection, a mandrel telescoped at one end over said projection and rotatably supported at its opposite end, a friction clutch including a member fixed on said mandrel and a member axially movable as well as freely rotatable on said mandrel, means for controlling the rotation of said member, and means exerting a force urging said member into axial engagement with the fixed member, said members being in driving relation by virtue of said force, and a thrust surface carried by said mandrel engaging said projection, whereby said force is transmitted from the member fixed in the mandrel to said element.

13. In control mechanism for a rotatable element, a frame on which said element is rotatably supported and which is subject to flexure in a direction generally parallel with the axis of rotation of said element, said element including a projection, a mandrel having a bore telescoped at one end over said projection, and rotatably supported on said frame at its opposite end, means forming a cylindrical surface of enlarged diameter and limited axial extent on said projection for engaging the bore of the mandrel, whereby clearance is provided within said bore permitting angular misalignment of said element and said mandrel, means connecting said element and said mandrel in a driving relation, a friction clutch including a member fixed on said mandrel and a member rotatable on said mandrel and axially movable into engagement with the other member, said members being adapted to be in driving relation by virtue of an axial force urging said members into engagement, means controlling rotation of the member mounted on the mandrel, and means forming a thrust surface in said mandrel for engaging the end of said projection and restraining axial movement of the mandrel in response to said force.

14. In control mechanism for a rotatable element, a brake mechanism, means exerting a resilient force to cause said brake to restrain rotation of said element, a clutch including an axially movable member serving upon movement in one direction to connect said element with a source of power, an arm for moving said axially movable member, a lever pivoted on said arm, means for moving said lever, and means forming a connection between said lever and said force exerting means and providing a movable fulcrum for said lever, the force exerted by said force exerting means opposing movement of said fulcrum, whereby movement of said lever in one direction causes said arm to move said movable clutch member.

15. In control mechanism for a rotatable element, a friction clutch for connecting said element with a source of power, a normally engaged brake for controlling rotation of said element, and common operating means for said clutch and said brake, comprising a movable arm for operating said clutch to engage and disengage, a member pivoted on said arm and connected with said brake at a point spaced from the pivot for causing said brake to release in response to movement of said member in one direction about its pivot and causing said arm to operate the clutch to engage, stop means on said arm engageable by said member in response to movement of said member in the opposite direction about its pivot, said arm and said member moving thereafter as a unit and causing said point of connection on said member to move in brake releasing direction, and an operating element connected to said arm for optionally imparting movement in either direction thereto.

GOTTFRIED MEILI.